Feb. 13, 1923.

H. J. FERRIS

ANIMAL PEN

Filed Feb. 16, 1922

1,445,307

Inventor,
Howard J. Ferris,
By Dyrenforth, Lee, Chritton & Wiles,
Attys.

Patented Feb. 13, 1923.

1,445,307

UNITED STATES PATENT OFFICE.

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

ANIMAL PEN.

Application filed February 16, 1922. Serial No. 536,935.

*To all whom it may concern:*

Be it known that I, HOWARD J. FERRIS, a citizen of the United States, residing at Harvard, in the county of McHenry and State of Illinois, have invented a new and useful Improvement in Animal Pens, of which the following is a specification.

This invention relates to animal pens and the like and is fully described in the following specification and shown in the accompanying drawing, in which.

Figure 1:
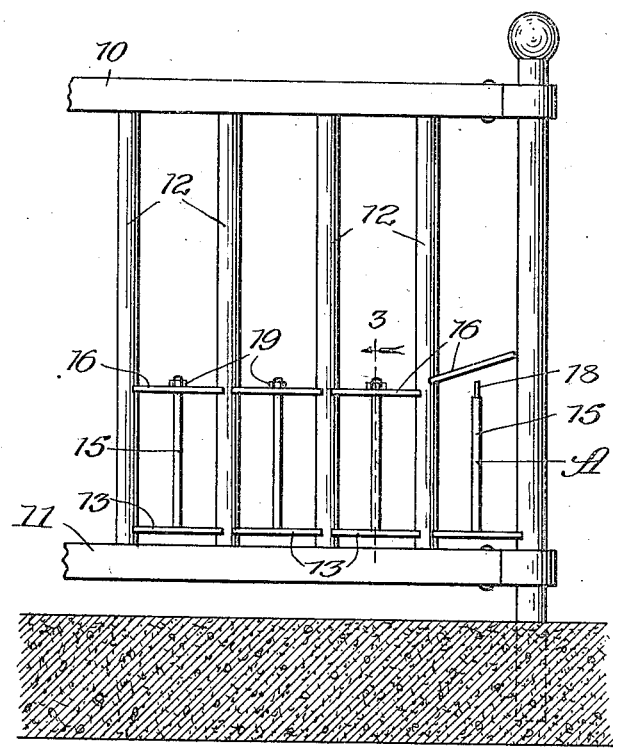
Figure 1 is a side elevation of an animal pen embodying my invention.
Figure 2:
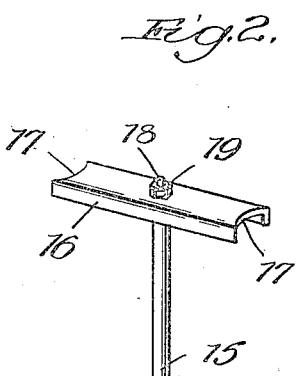
Fig. 2 is a perspective view of a filling unit drawn to an enlarged scale.
Figure 3:
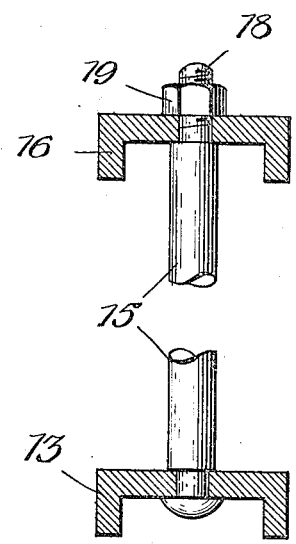
Fig. 3 is an enlarged vertical section on the line 3 of Fig. 1.

The animal pen to which this invention is applied consists of a well known form of pen having top and bottom rails 10 and 11 respectively, to which are secured in any well known manner vertical tubes 12 which are preferably circular in cross section. The spaces between the vertical members 12 may be adequate for the housing of calves or large hogs but may be altogether too large for the use of this pen for retaining small pigs and the like. It sometimes happens, therefore, that it is essential that a temporary filler be used.

For this purpose I employ a temporary filler consisting of a strut member 13 having its ends 14 concavely rounded to fit accurately between the vertical tubes 12, and a vertical rod 15 secured to the center of the member 13 and extending substantially at right angles thereto.

By tilting this member to one side it may be readily inserted between a pair the legs of the vertical tubes 12, when it may be straightened up into the position shown in Figure 1, as at A. A horizontal strut 16 the ends 17 of which are concavely rounded and accurately fit in the spaces between the vertical tubes, is then inserted as shown in Figure 1, between the vertical tubes 12 and over the upper threaded end of the rod 15 which passes through a hole 18 therein. A nut 19 is then screwed down over the upper threaded end of the rod 15 and the filler is securely fastened in the pen.

Removal of this device is quickly accomplished by reversal of these operations.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In combination, an animal pen having straight vertical bars, a filler for said bars comprising a T-shaped member, the cross bar thereof being insertable between said bars after the latter are in place, and means for securing said T-shaped member in said position.

2. In combination, an animal pen having straight vertical bars, a filler for said bars comprising a T-shaped member, the cross bar thereof having notched ends insertable between said bars after the latter are in place, and means for securing the leg of said T-shaped member in said position.

3. In combination, an animal pen having straight vertical bars, a filler for said bars comprising a T-shaped member, the cross bar thereof having notched ends insertable between said bars after the latter are in place, a strut member insertable between said bars, and means for fastening said strut member to the leg of said T-shaped member to secure them in said position.

4. In combination, an animal pen having straight vertical bars, a filler for said bars comprising a member having notched ends insertable between said bars after the latter are in place, a notched strut insertable between said bars and adapted to be secured to said member for securing said member in said position.

5. In combination, an animal pen having straight vertical bars, a filler for said bars comprising a T-shaped member having notched ends insertable between said bars after the latter are in place, and a notched strut insertable between said bars and over the middle leg of said T-shaped member for preventing it from being turned to a position where it can be removed from between said vertical bars.

6. A filling unit for spaces between parallel round tubes consisting of a T-shaped element, the head of the T being formed to fit accurately between adjacent tubes when at right angles thereto and a member similar to said head of the T-shaped element adapted to fit over the central leg of said element to retain the whole on said tubes.

HOWARD J. FERRIS.